(12) United States Patent
Pavlyushchik

(10) Patent No.: US 8,990,934 B2
(45) Date of Patent: Mar. 24, 2015

(54) AUTOMATED PROTECTION AGAINST COMPUTER EXPLOITS

(71) Applicant: Kaspersky Lab ZAO, Moscow (RU)

(72) Inventor: Mikhail A. Pavlyushchik, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 96 days.

(21) Appl. No.: 13/648,863

(22) Filed: Oct. 10, 2012

(65) Prior Publication Data

US 2013/0227680 A1 Aug. 29, 2013

(30) Foreign Application Priority Data

Feb. 24, 2012 (RU) ................ 2012106465

(51) Int. Cl.
*G06F 11/00* (2006.01)
*G06F 21/00* (2013.01)

(52) U.S. Cl.
CPC ...................................... *G06F 21/00* (2013.01)
USPC .......................................................... 726/22

(58) Field of Classification Search
CPC ... G06F 21/51; G06F 12/1416; G06F 12/145; G06F 21/566
USPC .......................................................... 726/22
See application file for complete search history.

(56) References Cited

U.S. PATENT DOCUMENTS

| | | | |
|---|---|---|---|
| 6,779,099 B2 | 8/2004 | Hou et al. | |
| 7,475,220 B1 | 1/2009 | Hastings | |
| 7,624,373 B2 | 11/2009 | Pandit et al. | |
| 7,673,116 B2 | 3/2010 | Hummel et al. | |
| 7,836,504 B2 | 11/2010 | Ray et al. | |
| 7,886,148 B2 | 2/2011 | Kiriansky et al. | |

(Continued)

FOREIGN PATENT DOCUMENTS

| | | |
|---|---|---|
| EP | 951676 | 4/2002 |
| EP | 806725 | 8/2003 |

(Continued)

OTHER PUBLICATIONS

Maaser et al. A concept for Monitoring Self-transforming code using memorypage access control management, Oct. 2011, Retrieved from the Internet <URL: ieeexplore.ieee.org/xpls/abs_all.jsp?arnumber=6095942>, pp. 1-7 as printed.*

(Continued)

*Primary Examiner* — Michael Chao
(74) *Attorney, Agent, or Firm* — Patterson, Thuente, Pedersen, P.A.

(57) ABSTRACT

Protection of a computer system against exploits. A computer system has a memory access control arrangement in which at least write and execute privileges are enforced for allocated portions of memory. An association of the process thread and the first portion of memory is recorded. A limited access regime in which one of the write and execute privileges is disabled, is established, and is monitored for any exceptions occurring due to attempted writing or execution in violation thereof. In response to the exception being determined as a write exception, the associated process thread is looked up, and analyzed for a presence of malicious code. In response to the exception type being determined as an execute exception, the first portion of memory is analyzed for a presence of malicious code. In response to detection of a presence of malicious code, execution of the malicious code is prevented.

24 Claims, 7 Drawing Sheets

(56) References Cited

U.S. PATENT DOCUMENTS

| | | | |
|---|---|---|---|
| 7,971,255 B1 | 6/2011 | Kc et al. | |
| 7,984,304 B1 | 7/2011 | Waldspurger et al. | |
| 7,996,904 B1 | 8/2011 | Chiueh et al. | |
| 8,024,798 B2 | 9/2011 | Moritzen | |
| 8,074,281 B2 | 12/2011 | Peinado et al. | |
| 8,104,089 B1 | 1/2012 | Guo et al. | |
| 2003/0014667 A1 | 1/2003 | Kolichtchak | |
| 2007/0016953 A1 | 1/2007 | Morris et al. | |
| 2007/0226797 A1 | 9/2007 | Thompson et al. | |
| 2008/0040710 A1 | 2/2008 | Chiriac | |
| 2008/0177994 A1 | 7/2008 | Mayer | |
| 2009/0055571 A1 | 2/2009 | Budko et al. | |
| 2009/0222923 A1* | 9/2009 | Dixon | 726/24 |
| 2009/0307430 A1 | 12/2009 | Bruening et al. | |
| 2009/0307431 A1 | 12/2009 | Garst et al. | |
| 2010/0287414 A1 | 11/2010 | Pardoe et al. | |
| 2011/0047543 A1* | 2/2011 | Mohinder | 718/1 |
| 2013/0086299 A1* | 4/2013 | Epstein | 711/6 |
| 2013/0097355 A1* | 4/2013 | Dang et al. | 711/6 |

FOREIGN PATENT DOCUMENTS

| | | |
|---|---|---|
| GB | 2378005 | 1/2003 |
| RU | 2417429 | 4/2011 |
| WO | WO2008131446 | 10/2008 |

OTHER PUBLICATIONS

Kumar, Applying User-Mode Memeory Scanning on Windows NT, 2008, Retrieved from the Internet <URL: http://sites.google.com/site/ericuday/EricUdayKumar-VB2008.pdf>, pp. 1-8 as printed.*

Marignoni et al., Omniunpack, 2007, Retrieved from the Internet <URL: ieeexplore.ieee.org/xpls/abs_all.jsp?arnumber=4413009>, pp. 1-10 as printed.*

WX Wikipedia. http://en.wikipedia.org/w/index.php?title=W%5EX&oldid=511430930 Sep. 27, 2012.

Executable compression Wikipedia. http://en.wikipedia.org/w/index.php?title=Executable_compression&oldid=510286153 Sep. 27, 2012.

Exploit Wikipedia. http://en.wikipedia.org/w/index.php?title=Exploit_(computer_security)&oldid=513843931 Sep. 27, 2012.

Russian Search Report for Russian Application No. 2012106465/08(009793) dated Feb. 24, 2012.

European Search Report for European Application No. EP13175197 dated Dec. 4, 2013.

* cited by examiner

AUTOMATED PROTECTION AGAINST COMPUTER EXPLOITS

CLAIM TO PRIORITY

This Application claims the benefit of Russian Federation Patent Application No. 2012106465 filed Feb. 24, 2012, the disclosure of which is incorporated by reference herein.

FIELD OF THE INVENTION

The invention relates generally to information processing security and, more particularly, to protection against computer exploits based on stopping and checking executable code before its execution.

BACKGROUND OF THE INVENTION

Computer viruses and other malicious programs which are spread through the Internet and local networks and through portable media continue to present an ongoing challenge to the public. Perhaps the most prominent of these are the so-called exploits, which can take the form of code fragments or commands that take advantage of vulnerabilities in software. Such vulnerabilities are caused by mistakes made when programming or designing applications. With the growth of the number and complexity of applications, the number of vulnerabilities inevitably grows as well; writers of malicious programs actively take advantage of this, already using not only single exploits but whole sets of them, designed for multiple programs and for their various versions. Exploits can be designed for specific operating systems, browsers, websites, etc.

In order to resolve the issue of countering the exploits, software manufacturers constantly produce updates of their applications in order to cover for known vulnerabilities, while manufacturers of operating systems and anti-virus companies use various methods for fighting known exploits.

One of the anti-exploit methods involves using a security function named DEP (Data Execution Prevention), which marks certain parts of memory as being intended to hold only data, which the NX bit enabled processor then understands as non-executable. This technology is being successfully used for protection from buffer overflow attacks, when the application writes data beyond the buffer allocated in the memory.

A related technology has been proposed for detecting possible malicious code that gets unpacked at run-time, such as the approach disclosed in U.S. Pat. No. 8,104,089. This approach injects a packing manager into a process, or installs it in the operating system's kernel. The packing manager uses memory page write and execute permissions to track when a program attempts to first write to, and then execute code from, a memory page. This approach uses the operations of the unpacker to restore the packed code from its packed state, but ensures that the code cannot be subsequently executed without being checked for malware. This technique deals particularly with packers, but it does not address the diversity of operations that are used by exploits, which can introduce malicious code in a variety of ways, not just through unpacking of the code.

Another technology, named ASLR (Address Space Layout Randomization), randomly arranging the positions of key data areas, usually including the base of the executable and position of libraries, heap, and stack in the address space of the process; this significantly complicates the exploitation of some vulnerabilities.

It should be pointed out that the above-mentioned technologies allow to successfully fight most of today's exploits, but in a number of cases, it is not possible to track the launch of the latest exploit variants, as exploit creators always look for newer ways to bypass the existing protection technologies. A practical and efficient solution is needed to address these challenges.

SUMMARY OF THE INVENTION

One aspect of the invention is directed to a method for protecting against exploits in a computer system utilizing a memory access control arrangement in which at least write and execute privileges are enforced for allocated portions of memory. According to the method, in response to a request by a process thread running in the computer system for allocation of a first portion of memory, an association of the process thread and the first portion of memory is recorded. The memory access control arrangement is adjusted to establish a limited access regime in which one of the write and execute privileges is disabled. The method monitors the memory access control arrangement for any exceptions occurring due to attempted writing or execution in violation of the limited access regime. In response to an occurrence of a first exception corresponding to the first portion of the memory, an exception type of the first exception is determined. In response to the exception type being determined as a write exception, the process thread associated with the first portion of memory is looked up in the record, the process thread is analyzed for a presence of malicious code. In response to the exception type being determined as an execute exception, the content of the first portion of memory is analyzed for a presence of malicious code. In response to detection of a presence of malicious code as a result of the analyzing, execution of the malicious code is prevented.

A related aspect is directed to a protection system for protecting against exploits. In the system, a malware analysis module is configured to detect malicious code of an exploit. An interceptor module is configured to detect a request by a process thread running in the computer system for allocation of a first portion of memory. The interceptor module is further configured to record an association of the process thread and the first portion of memory; adjust memory access control arrangement to establish a limited access regime in which one of the write and execute privileges is disabled; and monitor the memory access control arrangement for any exceptions occurring due to attempted writing or execution in violation of the limited access regime. In response to an occurrence of a first exception corresponding to the first portion of the memory, an exception type of the first exception is determined by the interceptor module. In response to the exception type being determined as a write exception, the process thread associated with the first portion of memory is looked up, and analysis by the malware analysis module is initiated to look for a presence of malicious code in the process thread. In response to the exception type being determined as an execute exception, the malware analysis module is initiated to look for a presence of malicious code in the first portion of memory. The malware analysis module is configured to prevent execution of the malicious code in response to detection of a presence of malicious code as a result of the analysis.

BRIEF DESCRIPTION OF THE DRAWINGS

The invention may be more completely understood in consideration of the following detailed description of various embodiments of the invention in connection with the accompanying drawings, in which.

Figure 1:
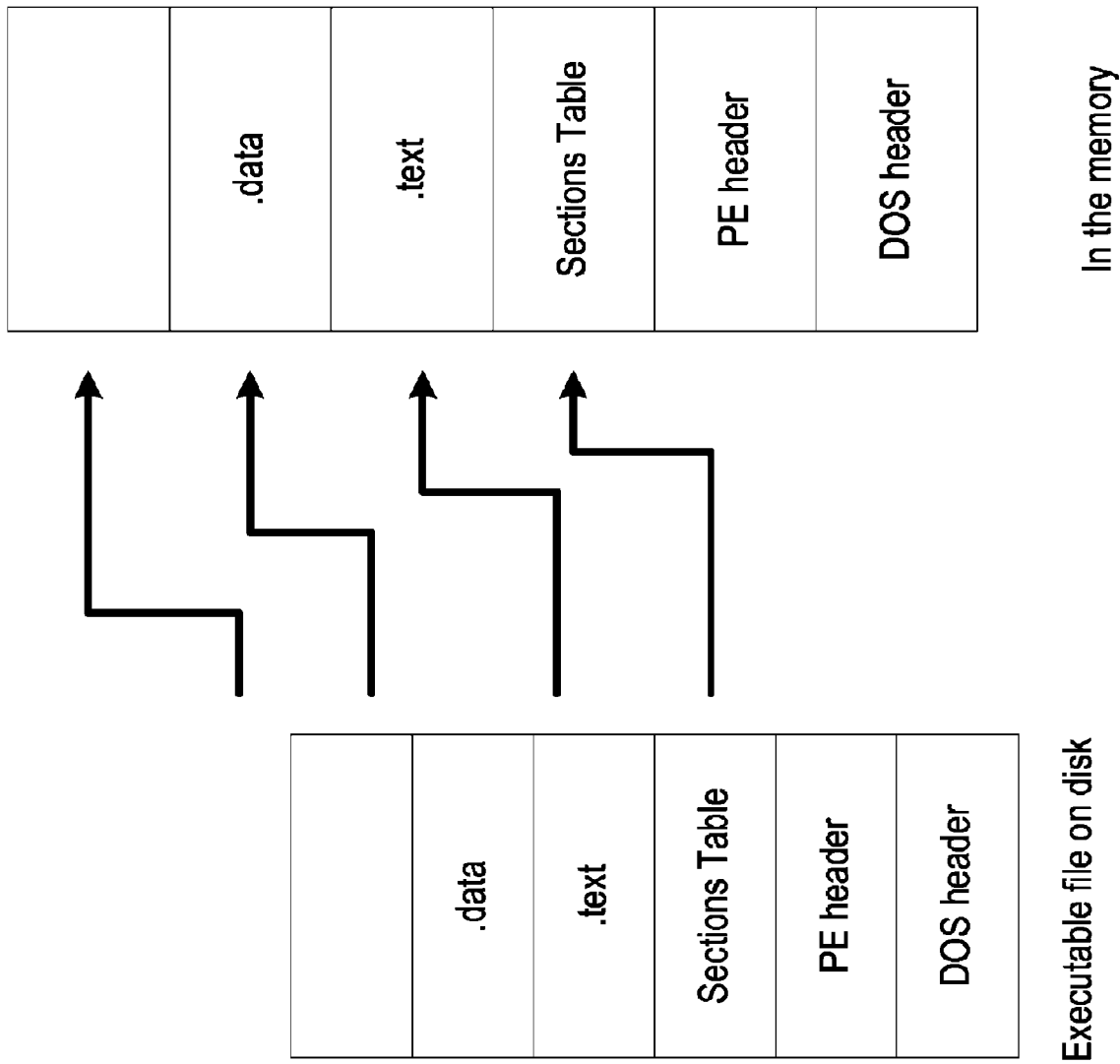
FIG. 1 is a diagram illustrating an exemplary memory operation of a computer system in which an executable file of a program is loaded from a disk, or a non-volatile data storage device, into the memory.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

FIG. 1 is a diagram illustrating an exemplary memory operation of a computer system in which an executable file of a program is loaded from a disk, or a non-volatile data storage device, into the memory. Each executable file has associated with it various segments, or sections, such as: code (.text), data (.data), non-initialized data (.bss), and memory space dynamically allocated during loading in the form of a heap and a stack. Each segment has its own purpose; for example, the .text code segment contains directly executable instructions. During loading, each segment is allocated a certain memory space (memory pages in case of paging memory-management scheme).

When instructions are executed, the code segment uses an EIP register, which contains an absolute address of the next instruction to be executed. Usually, the instruction pointer does not go beyond the code segment, but this can happen if an exploit is running, which can change the return address of the executing function in case of buffer overflow to a different piece of code that performs a malicious function.

Figure 2:
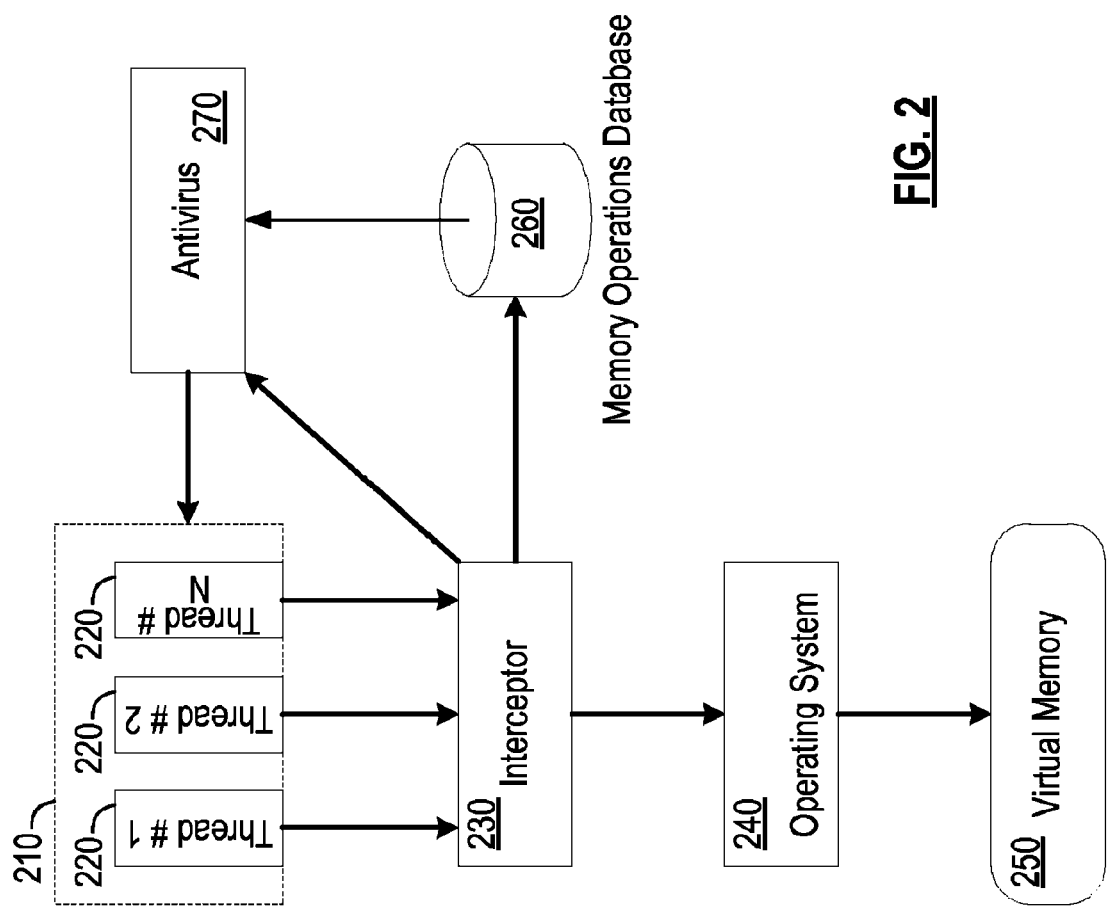
FIG. 2 is a diagram illustrating a system according to one embodiment of the invention for detection of an exploit program code which uses vulnerabilities in software.

FIG. 2 is a diagram illustrating a system according to one embodiment of the invention for detection of a program code which uses vulnerabilities in software. An application 210, such as, for example, Microsoft Internet Explorer or Mozilla Thunderbird, launched in the operating system (OS) 240, creates a number of threads 220 that are executed on the computing hardware and managed by the OS. During execution, one of the threads 220 requests that the operating system 240 to allocate a memory page 250. Each allocated page may be assigned various attributes—it can be read (R), data can be written (W) into it, and code written in it can be executed (X).

For an exploit to be effective, the code of the exploit must first be written in the memory at a certain address, then executed. Thus, to be usable by the exploit, the allocated memory page must have both, a W attribute, and an X attribute, in order to permit writing of the exploit code into it, and then to permit execution of that code. In this case, the exploit code would be implemented during the execution of one of the threads 220.

According to one aspect of the invention, an analysis of both, memory-related operations, and the threads themselves, are performed in order to successfully detect exploits. In one such embodiment, an interceptor module 230 is used to track the operations with memory pages by intercepting requests that are addressed to the memory. For example, during the processing of a request by one of the threads 220 to allocate a new memory page, the interceptor module 230 writes the page's address, attributes, and the Thread Identifier (TID) of the thread 220 into the memory operations database 260 in response to allocation of a page in the virtual memory 250 of the Operating System 240.

The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more general purpose computers (such as the one described in greater detail below) that execute an operating system, system programs, and application programs, while also implementing the module using multitasking, multithreading, distributed (e.g., cloud) processing, or other such techniques. Accordingly, each module can be realized in a variety of suitable configurations, and should not be limited to any particular implementation exemplified herein.

In various embodiments, other items of information can be included in memory operations database 260. In one such embodiment, a portion of the Page Table Entry (PTE) of the relevant page is included in the memory operation database 260 instead of the page's address. In another embodiment, the database 260 is written to only if the memory page has W and X attributes. In another embodiment, information on all memory page operations is stored in the database 260. In yet another embodiment, a process identifier (PID) 210 and the records in the database 260 related to all processes launched in the Operating System 240 are additionally stored in the database 260.

The system illustrated in FIG. 2 includes an antivirus module 270, which reads the memory operation database 260 in order to check the condition of the virtual memory 250 of the process 210, with the purpose of tracking the changes of the memory pages' attributes, which is discussed below in more detail.

Figure 3:
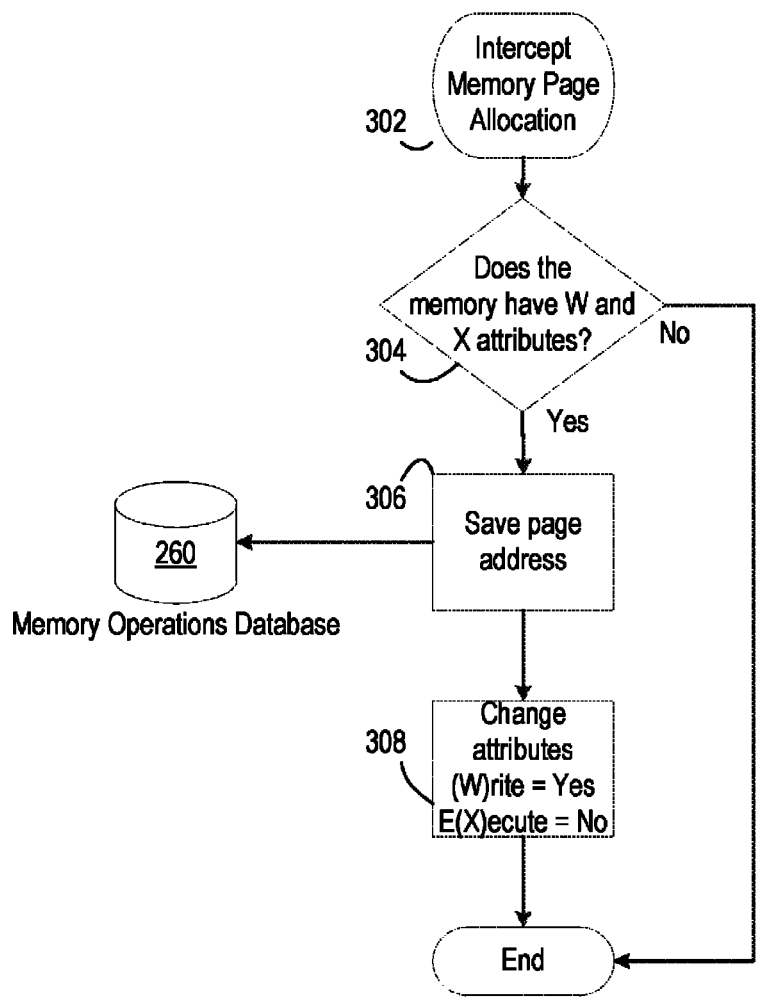
FIG. 3 illustrates a method of operation of an interceptor module of the system of FIG. 2 when the process threads request allocation of a memory page according to one embodiment.

FIG. 3 illustrates a method of operation of the interceptor module 230 when the process threads request allocation of a memory page according to one embodiment. At stage 302, in response to a request made by a process thread to allocate a memory page, the request is intercepted by the interceptor module 230, after which the memory page is allocated. At stage 304, the interceptor module 230 determines the page's attributes and, if the page has W and X attributes, then at stage 306, the page's address is saved in memory operations database 260. The presence of the W and X attributes, together, means that an exploit can be written in the memory page, and can then be executed. In order to prevent the execution of the code, the interceptor module 230 at stage 308 removes the X attribute, which will not allow the code written in this page to be executed.

Figure 4:
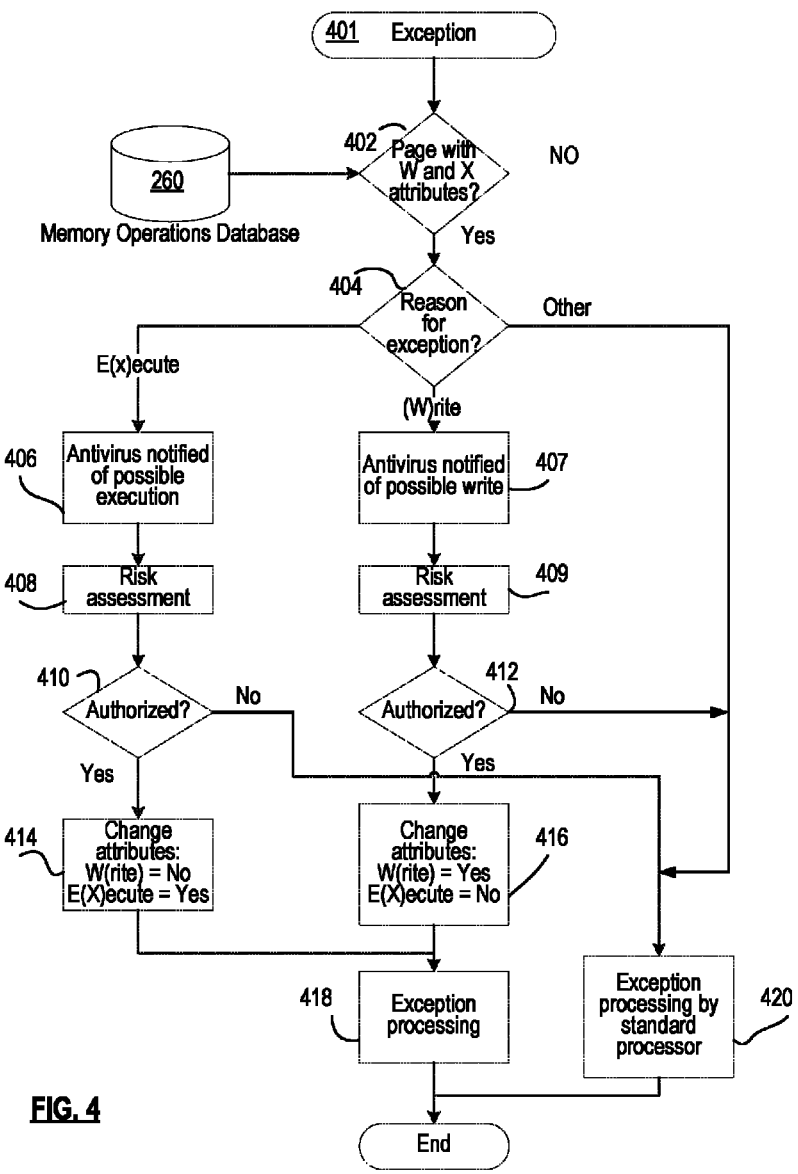
FIG. 4 is a flow diagram illustrating a method for tracking the memory-related operations using the interceptor module of the system of FIG. 2 according to one embodiment.

FIG. 4 is a flow diagram illustrating a method for tracking the memory-related operations using the interceptor module 230 according to one embodiment. At stage 401, there is a detection of an exception caused by one of the threads 220 trying to perform prohibited actions with the data saved at a certain address in the Memory 250—for example, to execute or write the data, while the attributes of the relevant memory page are not set to permit the action (i.e. the execute (X) and the write (W) attributes do not have a set Yes value. In the Windows operating system, the EXCEPTION_ACCESS_ VIOLATION is an example of this kind of exception.

Then, at stage 402, there is a lookup of the page's address through a request to the memory operation database 260, where the information about the page with the preset W and X attributes was saved at stage 306. If the page is found, the algorithm advances to stage 404. If the exception was associated with an unknown page, a standard exception processor will be called, which is provided by the operating system 240 (stage 420).

At stage 404, a determination is made as to the type of the exception which occurred, namely, for writing or for executing (stages 406 and 407, respectively). This information is transferred to the antivirus module 270, which determines the response to the request by assessing the risk (stages 408 and 409, respectively). The risk assessment can be performed based on applying one or more known risk assessment solutions associated with a certain application or a launched process. In one of the embodiments, the risk assessment can be performed by checking the memory page for the presence of known exploit signatures. In related embodiments, the risk assessment can be done using heuristic analysis or emulation methods.

In other related embodiments, still other approaches can be used such as, for example, the approach described in U.S. Pat. No. 7,530,106, the disclosure of which is incorporated by reference herein. In this approach, a risk of a given process is assessed by assigning a special rating to the risk. The rating itself can be composed of two parts, the static and the dynamic. The statistics are computed based on the statistical features of the file being executed—size, location, imported libraries, compression, etc. The dynamics are based on the emulation results and depend on which operations were performed with the services, the file system, the registry, the network, etc.

If the Antivirus module 270 determines that writing or execution is to be permitted, it changes the page flags to the following configurations:

W=No, X=Yes, if there was an execution request (stage 414);

W=Yes, X=No, if there was a writing request (stage 416).

This ensures protection from consecutive actions of writing and execution. Each exception is processed in the above described manner, and the information about each such event is saved with the analysis results for further detection of a possible exploit at stage 418. As the memory page continues to be used by a process that writes to, and executes code from, the memory page, the permissions can alternate as:

W=No, X=Yes;
W=Yes, X=No;
W=No, X=Yes
W=Yes, X=No;

etc., with risk assessment occurring at each switch in permissions, until the process is either completed or until malware is detected, resulting in termination of the process.

Figure 5:
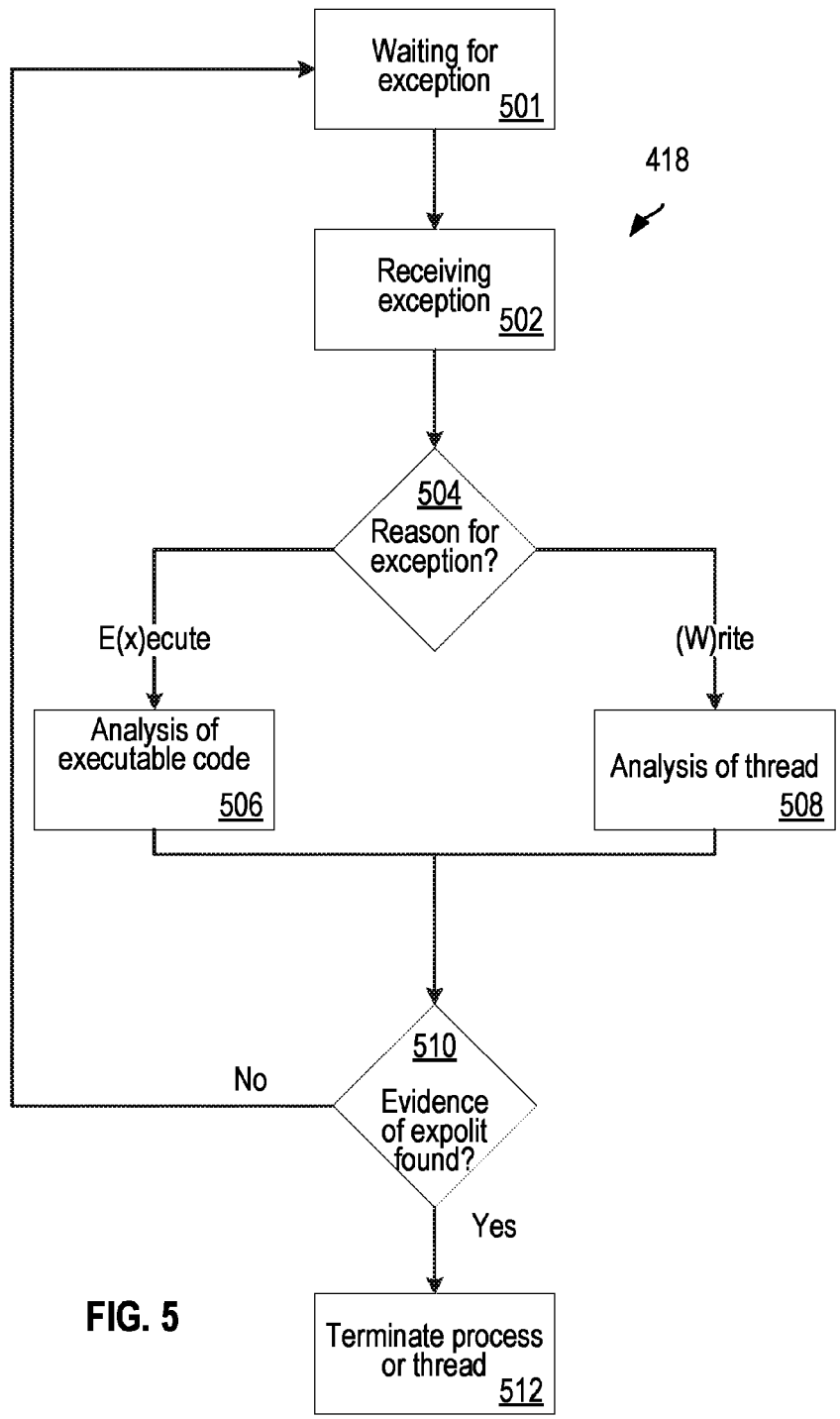
FIG. 5 is a flow diagram illustrating a method for detection of a potentially hazardous executable code before its execution according to one embodiment.

FIG. 5 is a flow diagram illustrating an example of a method for detection of a potentially hazardous executable code before its execution according to one embodiment. A potentially hazardous executable code in this case can include an exploit code. In the exception processing at stage 418, stage 502 analyzes the exception information. At stage 504, the exception's cause is determined (i.e., whether it was an attempt to execute the code or an attempt at writing).

In response to an attempt to execute the code, stage 506 analyzes the executable code written in the memory page. In response to a writing attempt, stage 508 analyzes the thread 220 which is trying to write the executable code into the memory page. The analysis of the executable code can be performed using known signature or heuristic methods, which allow for the detection both, known exploits, and their modifications. Even if it is not possible to identify the executable code as an exploit code, the operations with the memory page attributes allow reliable prevention of its execution. If, at stage 510, it was concluded that signs of an exploit are detected, i.e. the analysis at stage 506 or at stage 508 provide positive results, then, at stage 512, the operation with the memory requested by the process thread of the application 210 will be terminated. This can mean either the termination of the whole process 210, including all associated threads 220, or the termination of a specific thread 220 through which the execution of the exploit code is being made possible. Otherwise, if there is no evidence found of an exploit at 510, the method loops back to stage 501 to wait for the next exception.

Figure 6:
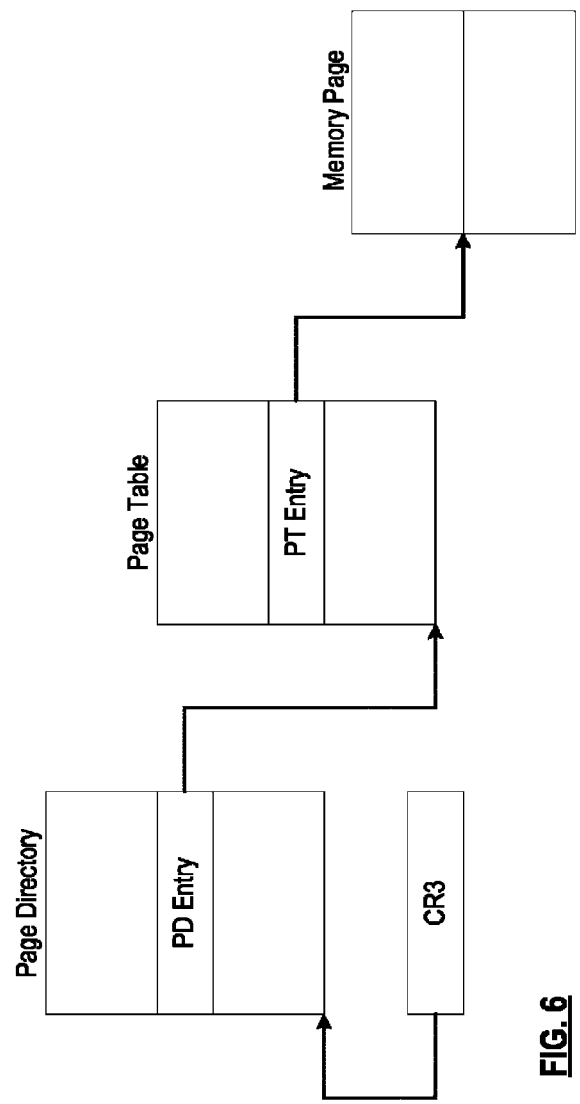
FIG. 6 is a diagram illustrating a page table for use with certain embodiments of the invention.

In one embodiment, the execution of an interceptor module 230 is in the form of a driver of the Operating System 240. FIG. 6 is a diagram illustrating an exemplary page table. Usually, such structures have multiple levels. The Registry CR3 stores an address in the physical memory for the first page in the page directory. Each record in the page directory entry (PDE) refers to the relevant page table, each record in which the page table entry (PTE) further refers directly to the memory page. A number of flags is directly connected with the PTE (i.e. with the page); some of them are responsible for indicating the access permissions (read (R) or write (W)). Also, a special cache is used in the CPU, which is a translation lookaside buffer (TLB). Such cache is designed to accelerate the transmission of the virtual memory address to the physical memory address. However, the TLB itself should generally be synchronized with the page table, such that each process has its own address space. With multiple operations in the memory, the TLB is completely or partially flushed; such operations are resource-intensive in terms of buffer cleanup (since a response from a buffer takes only a few cycles, while a memory request will take several thousand cycles).

In other embodiments, aspects of the invention are implemented as a modification of the memory dispatcher of the operating system 240 or as a part of a hypervisor. In a memory manager embodiment, events are created in response to switching of memory page attributes, and are used by the interceptor module 230 to trigger operation of the protective techniques discussed above. Similarly, a modification of the PTE can be made for the purpose of supporting additional fields used by aspects of the invention (for example, a bit indicating a change of the W and X attributes).

Figure 7:
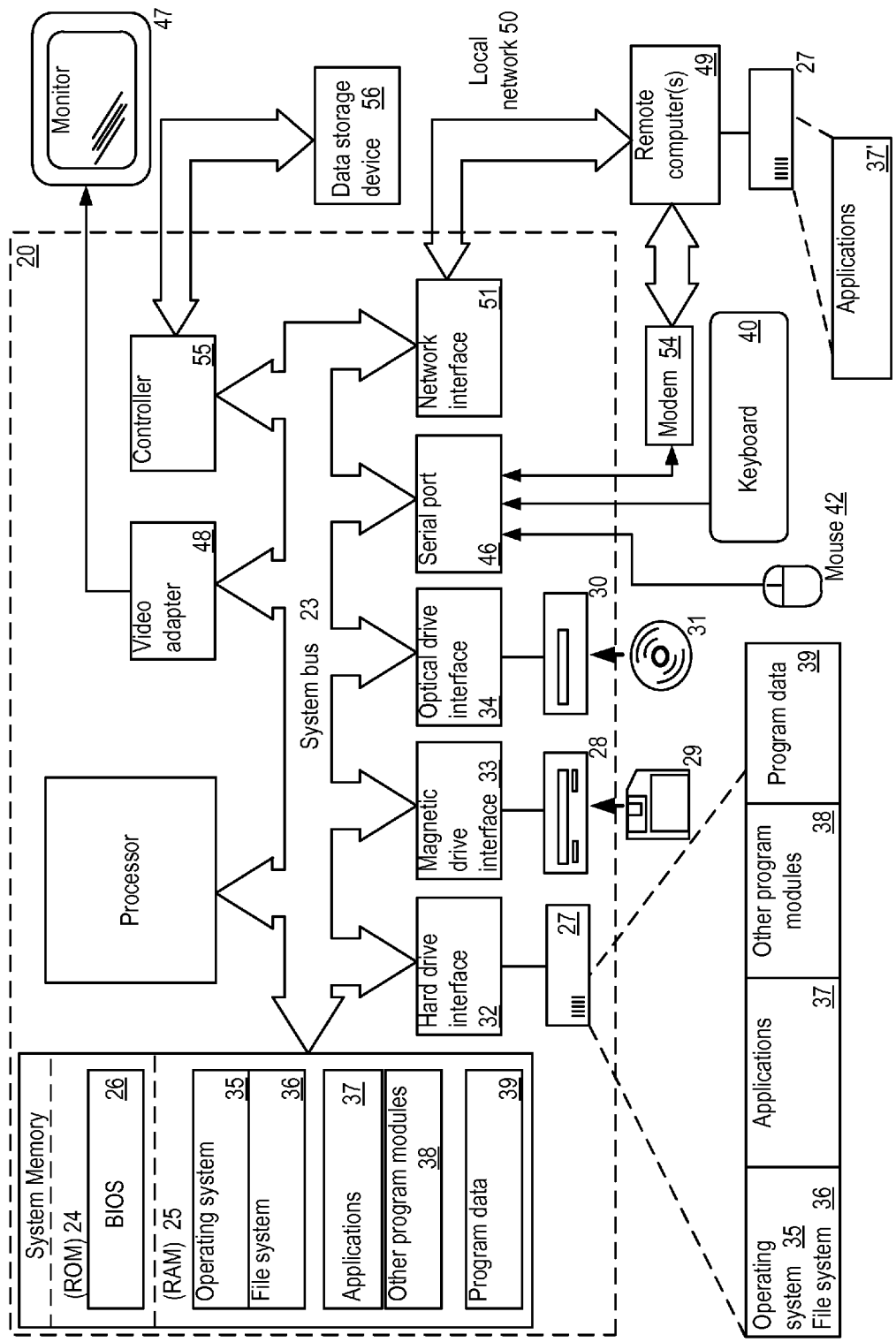
FIG. 7 is a block diagram illustrating an example of a general purpose computer system on which embodiments of the invention can be implemented.

FIG. 7 is a block diagram illustrating an example of a general purpose computer system on which embodiments of the invention can be implemented. Personal Computer or Server 20, includes a Central processor 21, a System Memory 22 and a System Bus 23, which contains various system components, including a memory connected with a Central processor 21. The System Bus 23 is realized as any bus structure known at the relevant technical level, containing, in turn, a bus memory or a bus memory controller, a peripheral bus and a local bus, which is able to interact with any other bus architecture. The System Memory has a Read-Only Memory (ROM) 24 and a Random Access Memory (RAM) 25. The Basic Input/Output System (BIOS) 26 contains basic procedures ensuring transfer of information between the elements of a Personal Computer 20, for example, during the operating system boot using ROM 24.

The Personal Computer 20, in turn, has a Hard Drive 27 for data reading and writing, a Magnetic Disk Drive 28 for reading and writing on removable Magnetic Disks 29, and an Optical Drive 30 for reading and writing on removable Optical Disks 31, such as CD-ROM, DVD-ROM and other optical media. The Hard Drive 27, the Magnetic Drive 28, and the Optical Drive 30 are connected with a System Bus 23 through a Hard Drive Interface 32, a Magnetic Drive Interface 33 and an Optical Drive Interface 34, respectively. The drives and the corresponding computer information media represent energy-independent means for storage of computer instructions, data structures, program modules and other data on the Personal Computer 20.

The system depicted includes a Hard Drive 27, a removable Magnetic Drive 29 and a removable Optical Drive 31, but it should be understood that it is possible to use other types of Computer Information Media 56, capable of storing data in a computer-readable form (solid state drives, flash memory cards, digital disks, random-access memory (RAM), etc.), connected to the System Bus 23 through a Controller 55.

The Computer 20 has a File System 36, where the recorded Operating System 35 is stored, as well as additional Program Applications 37, other Program Modules 38 and Program Data 39. The user can input commands and information into the Personal Computer 20 using input devices (Keyboard 40, Mouse 42). Other input devices (not shown) can also be used, such as: a microphone, a joystick, a game console, a scanner, etc. Such input devices are usually connected to the Computer System 20 through a Serial Port 46, which, in turn, is connected to a system bus, but they can also be connected in a different way—for example, using a parallel port, a game port or a Universal Serial Bus (USB). The Monitor 47 or another type of display device is also connected to a System Bus 23 through an interface, such as a Video Adapter 48. In addition to the Monitor 47, the personal computer can be equipped with other peripheral output devices (not shown), such as speakers, a printer, etc.

The Personal Computer 20 is able to work in a network environment; in this case, it uses a network connection with one or several other Remote Computers 49. The Remote Computer(s) 49 is (are) similar personal computers or servers, which have most or all of the above elements, noted earlier when describing the substance of the Personal Computer 20 shown in FIG. 7. The computing network can also have other devices, such as routers, network stations, peering devices or other network nodes.

Network connections can constitute a Local Area Network (LAN) 50 and a World Area Network (WAN). Such networks are used in corporate computer networks or in corporate intranets, and usually have access to the Internet. In LAN or WAN networks, the Personal Computer 20 is connected to the Local Area Network 50 through a Network Adapter or a Network Interface 51. When using networks, the Personal Computer 20 can use a Modem 54 or other means for connection to a world area network, such as the Internet. The Modem 54, which is an internal or an external device, is connected to the System Bus 23 through a Serial Port 46. It should be clarified that these network connections are only examples and do not necessarily reflect an exact network configuration, i.e. in reality there are other means of establishing a connection using technical means of communication between computers.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method for protecting against exploits in a computer system utilizing a memory access control arrangement in which at least write and execute privileges are enforced for allocated portions of memory, the method comprising:

in response to a request by a process thread running in the computer system for allocation of a first portion of memory:
(a) recording an association of the process thread and the first portion of memory; and
(b) adjusting the memory access control arrangement to establish a limited access regime in which one of the write and execute privileges is disabled;
(c) monitoring the memory access control arrangement for any exceptions occurring due to attempted writing or execution in violation of the limited access regime;

(d) in response to an occurrence of a first exception corresponding to the first portion of the memory:
  determining an exception type of the first exception;
  performing an initial risk assessment of the process thread and its associated memory page to determine whether the attempted writing or execution is permitted, the initial risk assessment including at least one of: an exploit signature check, heuristic analysis of exploits, emulation analysis of exploits, statistical risk rating analysis;
  in response to the initial risk assessment determining that the attempted writing or execution is permitted, performing specialized exception processing wherein:
    in response to the exception type being determined as a write exception, the process thread associated with the first portion of memory in the recording is looked up, and the process thread for a presence of malicious code is analyzed;
    in response to the exception type being determined as an execute exception, content of the first portion of memory is analyzed for a presence of malicious code;
  (e) in response to detection of a presence of malicious code as a result of the specialized exception processing, preventing execution of the malicious code;
  (f) in response to a non-detection of any presence of malicious code as a result of the analyzing, permitting the attempted writing or execution and alternating the write and execute privileges to establish a new limited access regime;
  (g) monitoring the memory access control arrangement for any exceptions occurring due to attempted writing or execution in violation of the new limited access regime and repeating (a)-(f) to determine the presence of any exploits from continued execution of the process thread.

2. The method of claim 1, further comprising: in response to a non-detection of any presence of malicious code as a result of the analyzing, adjusting the data execution prevention privileges to permit only a privilege corresponding to the determined exception type.

3. The method of claim 1, wherein recording the association of the process thread and the first portion of memory includes creating an entry in a memory operations database.

4. The method of claim 3, wherein the entry in the memory operations database includes a thread identifier of the thread and an address of the first portion of memory.

5. The method of claim 3, wherein the entry in the memory operations database includes a portion of a page table entry corresponding to the first portion of memory.

6. The method of claim 1, wherein recording the association of the process thread and the first portion of memory is performed only in response to a request for allocation of the first portion of memory having both, write privileges, and execution privileges.

7. The method of claim 1, wherein adjusting the data execution prevention privileges to establish a limited access regime includes initially enabling the write privileges while disabling the execute privileges.

8. The method of claim 1, wherein the first portion of memory includes a memory page.

9. The method of claim 1, wherein the analysis of either the contents of the first portion of memory, or the process thread, is initiated in response to a single exception.

10. The method of claim 1, further comprising: in response to the exception type being determined as a write exception, looking up a plurality of process threads that are associated with the first portion of memory in the recording, and analyzing each of the plurality of process threads for a presence of malicious code.

11. The method of claim 1, wherein preventing execution of the malicious code includes termination of the process thread associated with the first portion of memory.

12. In a computer system having a memory access control arrangement configured to enforce at least write and execute privileges for allocated portions of memory, a protection system for protecting against exploits, the system comprising:
  a malware analysis module configured to detect malicious code of an exploit; and
  an interceptor module configured to detect a request by a process thread running in the computer system for allocation of a first portion of memory, the interceptor module further configured to:
    (a) record an association of the process thread and the first portion of memory;
    (b) adjust memory access control arrangement to establish a limited access regime in which one of the write and execute privileges is disabled;
    (c) monitor the memory access control arrangement for any exceptions occurring due to attempted writing or execution in violation of the limited access regime;
    (d) in response to an occurrence of a first exception corresponding to the first portion of the memory:
      determine an exception type of the first exception;
      perform an initial risk assessment of the process thread and its associated memory page to determine whether the attempted writing or execution is permitted, the initial risk assessment including at least one of: an exploit signature check, heuristic analysis of exploits, emulation analysis of exploits, statistical risk rating analysis;
    in response to the initial risk assessment determining that the attempted writing or execution is permitted, perform specialized exception processing wherein:
      in response to the exception type being determined as a write exception, the process thread associated with the first portion of memory in the recording is looked up, and the process thread for a presence of malicious code is analyzed;
      in response to the exception type being determined as an execute exception, content of the first portion of memory is analyzed for a presence of malicious code;
  wherein the malware analysis module is configured to:
    (e) in response to detection of a presence of malicious code as a result of the specialized exception processing, prevent execution of the malicious code;
    (f) in response to a non-detection of any presence of malicious code as a result of the analyzing, permit the attempted writing or execution and alternating the write and execute privileges to establish a new limited access regime;
    (g) monitor the memory access control arrangement for any exceptions occurring due to attempted writing or execution in violation of the new limited access regime and perform (a)-(f) to determine the presence of any exploits from continued execution of the process thread.

13. The system of claim 12, wherein the interceptor module is further configured to adjust the data execution prevention privileges to permit only a privilege corresponding to the determined exception type in response to a non-detection of any presence of malicious code by the malware analysis module.

14. The system of claim 12, wherein the interceptor module is further configured to record the association of the process thread and the first portion of memory as part of an entry in a memory operations database.

15. The system of claim 14, wherein the entry in the memory operations database includes a thread identifier of the thread and an address of the first portion of memory.

16. The system of claim 14, wherein the entry in the memory operations database includes a portion of a page table entry corresponding to the first portion of memory.

17. The system of claim 12, wherein the interceptor module is further configured to record the association of the process thread and the first portion of memory only in response to a request for allocation of the first portion of memory having both, write privileges, and execution privileges.

18. The system of claim 12, wherein the interceptor module is further configured to initially enable the write privileges while disabling the execute privileges in adjusting the data execution prevention privileges to establish a limited access regime.

19. The system of claim 12, wherein the first portion of memory includes a memory page.

20. The system of claim 12, wherein the interceptor module is configured to initiate analysis by the malware analysis module of either the contents of the first portion of memory, or the process thread, in response to a single exception.

21. The system of claim 12, wherein the interceptor module is further configured to look up a plurality of process threads that are associated with the first portion of memory in response to the exception type being determined as a write exception, and causing the malware analysis module to analyze each of the plurality of process threads for a presence of malicious code.

22. The system of claim 12, wherein the interceptor module is part of a driver of an operating system of the computer system.

23. The system of claim 12, wherein the interceptor module is part of a memory dispatcher of an operating system of the computer system.

24. A non-transitory computer-readable storage medium comprising instructions that, when executed in a computer system having a memory access control arrangement in which at least write and execute privileges are enforced for allocated portions of memory, cause the computer system to: protect itself against exploits such that:

in response to a request by a process thread running in the computer system for allocation of a first portion of memory:
(a) an association of the process thread and the first portion of memory is recorded;
(b) memory access control arrangement is adjusted to establish a limited access regime in which one of the write and execute privileges is disabled;
(c) the memory access control arrangement is monitored for any exceptions occurring due to attempted writing or execution in violation of the limited access regime;
(d) in response to an occurrence of a first exception corresponding to the first portion of the memory:
an exception type of the first exception is determined;
an initial risk assessment of the process thread and its associated memory page is performed to determine whether the attempted writing or execution is permitted, the initial risk assessment including at least one of: an exploit signature check, heuristic analysis of exploits, emulation analysis of exploits, statistical risk rating analysis;
in response to the initial risk assessment determining that the attempted writing or execution is permitted, specialized exception processing is performed wherein:
in response to the exception type being determined as a write exception, the process thread associated with the first portion of memory in the recording is looked up, and the process thread for a presence of malicious code is analyzed;
in response to the exception type being determined as an execute exception, content of the first portion of memory I is analyzed for a presence of malicious code;
(e) in response to detection of a presence of malicious code as a result of the specialized exception processing, execution of the malicious code is prevented;
(f) in response to a non-detection of any presence of malicious code as a result of the analyzing, the attempted writing or execution is permitted and the write and execute privileges are alternated to establish a new limited access regime;
(g) the memory access control arrangement is monitored for any exceptions occurring due to attempted writing or execution in violation of the new limited access regime and (a)-(f) are performed to determine the presence of any exploits from continued execution of the process thread.

* * * * *